US012726922B2

(12) United States Patent
Kim et al.

(10) Patent No.: US 12,726,922 B2
(45) Date of Patent: Sep. 1, 2026

(54) OPERATION METHOD OF TERMINAL AND WIRELESS COMMUNICATION SYSTEM FOR SUPPORTING MULTI-MOBILE COMMUNICATIONS

(71) Applicant: SAMSUNG ELECTRONICS CO., LTD., Suwon-si (KR)

(72) Inventors: Kiil Kim, Suwon-si (KR); Jinho Kim, Suwon-si (KR); Jonghyun Bang, Suwon-si (KR); Mingoo Kim, Suwon-si (KR); Joohyun Do, Suwon-si (KR); Jungwon Lee, Suwon-si (KR); Huiwon Je, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 305 days.

(21) Appl. No.: 18/413,890

(22) Filed: Jan. 16, 2024

(65) Prior Publication Data

US 2024/0251364 A1 Jul. 25, 2024

(30) Foreign Application Priority Data

Jan. 19, 2023 (KR) ........................ 10-2023-0008166
Jul. 6, 2023 (KR) ........................ 10-2023-0087989

(51) Int. Cl.
*H04W 56/00* (2009.01)
*H04B 7/185* (2006.01)

(52) U.S. Cl.
CPC ...... *H04W 56/001* (2013.01); *H04B 7/18513* (2013.01)

(58) Field of Classification Search
None
See application file for complete search history.

(56) References Cited

U.S. PATENT DOCUMENTS 5,978,653 A 11/1999 Taylor et al.
10,313,000 B2 * 6/2019 Buer ................. H04B 7/18513
(Continued)

FOREIGN PATENT DOCUMENTS

CN 114244419 A 3/2022
WO 2021/038012 A1 3/2021
(Continued)

OTHER PUBLICATIONS

European Extended Search Report issued Jul. 3, 2024 by the European Patent Office for EP Patent Application No. 24151809.1.

*Primary Examiner* — Faiyazkhan Ghafoerkhan
(74) *Attorney, Agent, or Firm* — Sughrue Mion, PLLC

(57) ABSTRACT

An operation method of a terminal includes receiving a synchronization signal from a first satellite in a first satellite group that includes first satellites, the first satellite group supporting plural radio access technologies (RATs), performing a higher layer signaling procedure with the first satellite, based on the synchronization signal, transmitting, based on the higher layer signaling procedure, to the first satellite, first channel status information regarding a second satellite group including second satellites from among the first satellites, the second satellite group supporting a RAT supported by the terminal, and performing wireless communication with a satellite in the second satellite group that is configured as a primary satellite, based on the first channel status information.

20 Claims, 11 Drawing Sheets

(56) References Cited

U.S. PATENT DOCUMENTS

| | | | | |
|---|---|---|---|---|
| 11,184,917 | B2 * | 11/2021 | Zacharias | H04W 28/0278 |
| 11,871,288 | B2 * | 1/2024 | Shin | H04W 36/0061 |
| 12,081,314 | B2 * | 9/2024 | Shrestha | H04B 7/18519 |
| 12,446,074 | B2 * | 10/2025 | Shin | H04W 74/006 |
| 2016/0149784 | A1 * | 5/2016 | Zhang | H04B 1/0003 370/229 |
| 2021/0022171 | A1 * | 1/2021 | Zacharias | G01S 19/12 |
| 2021/0092640 | A1 * | 3/2021 | Ravishankar | H04L 47/6275 |
| 2021/0143897 | A1 * | 5/2021 | Edge | H04B 7/18513 |
| 2022/0030511 | A1 * | 1/2022 | Wang | H04L 65/1095 |
| 2022/0109496 | A1 * | 4/2022 | Shrestha | H04B 7/18519 |
| 2022/0255714 | A1 * | 8/2022 | Nguyen | H04L 5/16 |
| 2022/0272757 | A1 * | 8/2022 | Liu | G01S 19/27 |
| 2023/0180297 | A1 * | 6/2023 | Shin | H04W 74/006 370/329 |
| 2023/0189088 | A1 * | 6/2023 | Shin | H04W 36/0061 455/427 |
| 2023/0189107 | A1 * | 6/2023 | Matsuda | H04B 7/18528 370/331 |
| 2023/0224023 | A1 * | 7/2023 | Kang | H04B 7/18504 375/262 |
| 2023/0319929 | A1 * | 10/2023 | Shrestha | H04W 76/27 370/329 |
| 2023/0344508 | A1 * | 10/2023 | Tseng | H04W 56/0045 |
| 2024/0251364 | A1 * | 7/2024 | Kim | H04B 7/18513 |
| 2025/0119780 | A1 * | 4/2025 | Chen | H04W 56/0045 |
| 2025/0212075 | A1 * | 6/2025 | Dowlatkhah | H04W 28/12 |

FOREIGN PATENT DOCUMENTS

| | | | |
|---|---|---|---|
| WO | 2021/249076 | A1 | 12/2021 |
| WO | 2021/250632 | A1 | 12/2021 |

* cited by examiner

Figure 9:
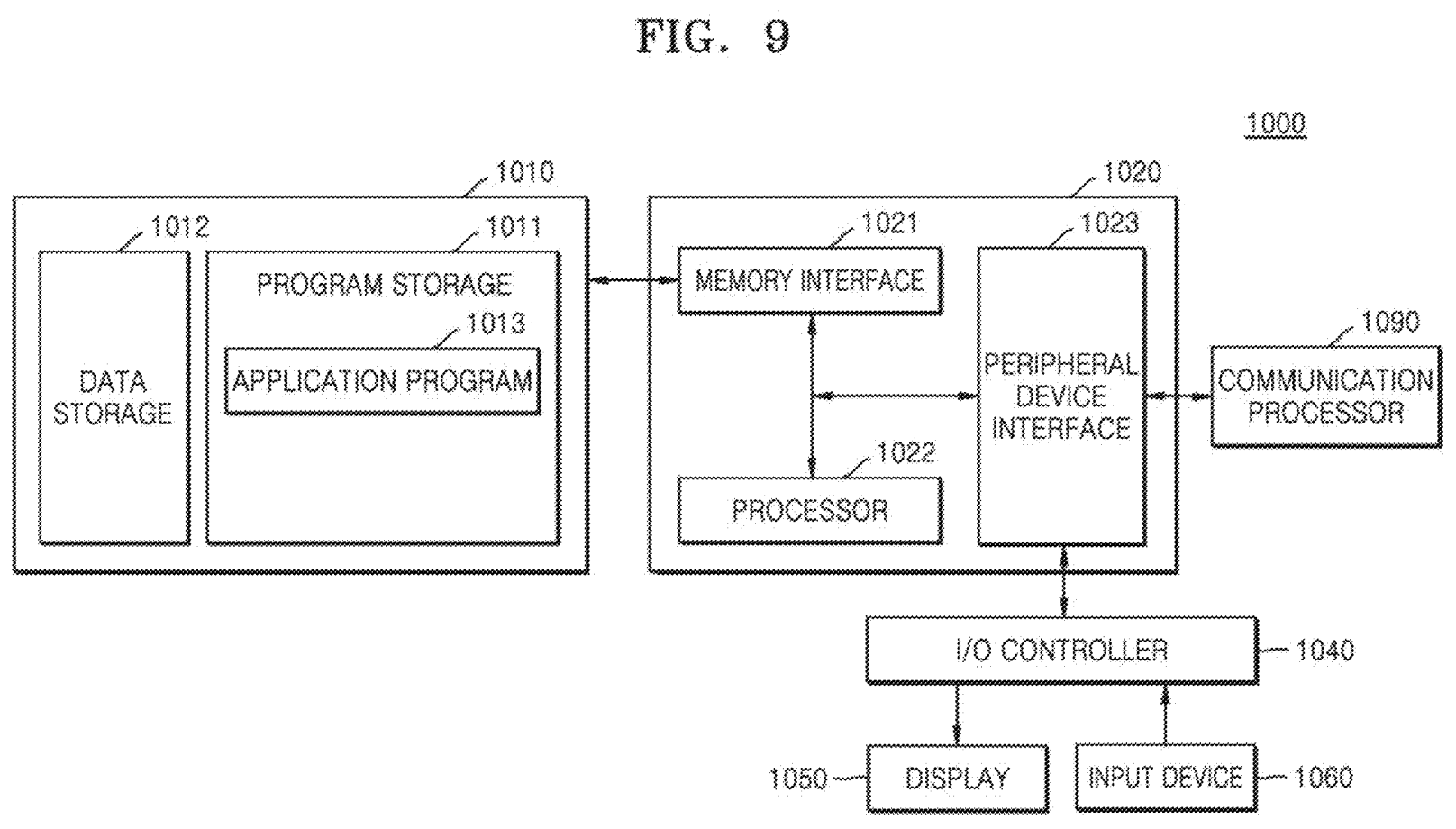

1010
1011 PROGRAM STORAGE
1013 APPLICATION PROGRAM
1012 DATA STORAGE 1020
1021 MEMORY INTERFACE
1022 PROCESSOR
1023 PERIPHERAL DEVICE INTERFACE

1090 COMMUNICATION PROCESSOR

1040 I/O CONTROLLER
1050 DISPLAY
1060 INPUT DEVICE

OPERATION METHOD OF TERMINAL AND WIRELESS COMMUNICATION SYSTEM FOR SUPPORTING MULTI-MOBILE COMMUNICATIONS

CROSS-REFERENCE TO RELATED APPLICATIONS

This application is based on and claims priority under 35 U.S.C. § 119 to Korean Patent Application No. 10-2023-0008166, filed on Jan. 19, 2023, and to Korean Patent Application No. 10-2023-0087989, filed on Jul. 6, 2023, in the Korean Intellectual Property Office, the disclosures of each of which being incorporated by reference herein in their entireties.

BACKGROUND

Methods and systems consistent with the present disclosure relate to an operation method of a terminal and a wireless communication system, and more particularly, to an operation method of a terminal in a wireless communication system including multiple satellites supporting multiple mobile communications.

Satellite communication systems have been developed as a next-generation mobile communication system to meet the demand for wireless data traffic that has exponentially increased due to the commercialization of existing terrestrial networks, such as long-term evolution (LTE) communication systems or new radio (NR) communication systems, and an increase in multimedia services, and to overcome coverage limitations of the existing terrestrial networks.

In a satellite communication system, various types of transmission modes may be available depending on an altitude and a speed of a satellite and a type of data, and a terminal may expect to receive various services according to a type of the satellite. In this regard, a method of configuring and operating two or more different radio access technologies (RATs) according to each satellite needs to be studied.

SUMMARY

It is an aspect to provide a wireless communication system capable of configuring a primary satellite and a secondary satellite in a satellite group when one or more satellites simultaneously use two or more different radio access technologies (RATs).

It is another aspect to provide an operation method of a terminal communicating with a base station by using a primary or secondary satellite.

According to an aspect of one or more embodiments, there is provided an operation method of a terminal, the operation method comprising receiving a synchronization signal from a first satellite in a first satellite group that includes a plurality of first satellites, the first satellite group being configured to support a plurality of radio access technologies (RATs); performing a higher layer signaling procedure with the first satellite, based on the synchronization signal; transmitting, based on the higher layer signaling procedure, to the first satellite, first channel status information regarding a second satellite group including a plurality of second satellites from among the plurality of first satellites, the second satellite group being configured to support a RAT supported by the terminal; and performing wireless communication with a satellite in the second satellite group that is configured as a primary satellite, based on the first channel status information.

According to another aspect of one or more embodiments, there is provided an operation method of a terminal, the operation method comprising receiving a synchronization signal from a first satellite in a first satellite group that includes a plurality of first satellites, the first satellite group being configured to support a plurality of radio access technologies (RATs); transmitting terminal information to the first satellite, based on the synchronization signal; receiving satellite information from the first satellite, based on the terminal information; transmitting, based on the satellite information, to the first satellite, first channel status information regarding a second satellite group including a plurality of second satellites among the plurality of first satellites, the second satellite group being configured to support a RAT supported by the terminal; and performing wireless communication with a satellite from among the plurality of second satellites of the second satellite group that is configured as a primary satellite, based on the first channel status information.

According to yet another aspect of one or more embodiments, there is provided a wireless communication system comprising a satellite group including a plurality of satellites, the satellite group configured to support a plurality of radio access technologies (RATs); a base station configured to perform a first higher layer signaling procedure with the satellite group; and a terminal configured to receive a synchronization signal from the satellite group and perform, based on the synchronization signal, a second higher layer signaling procedure with a first satellite in the satellite group, receive satellite information based on the second higher layer signaling procedure, and transmit, based on the satellite information, first channel status information regarding a sub-satellite group of the satellite group that includes satellites configured to support a RAT supported by the terminal, wherein the base station is further configured to configure one satellite of the sub-satellite group as a primary satellite, based on the first channel status information, and wherein the primary satellite is configured to perform wireless communication with the terminal.

BRIEF DESCRIPTION OF THE DRAWINGS

Various embodiments will be more clearly understood from the following detailed description taken in conjunction with the accompanying drawings, in which:

FIG. 9 is a block diagram illustrating an electronic device according to an embodiment.

DETAILED DESCRIPTION

Figure 1A:
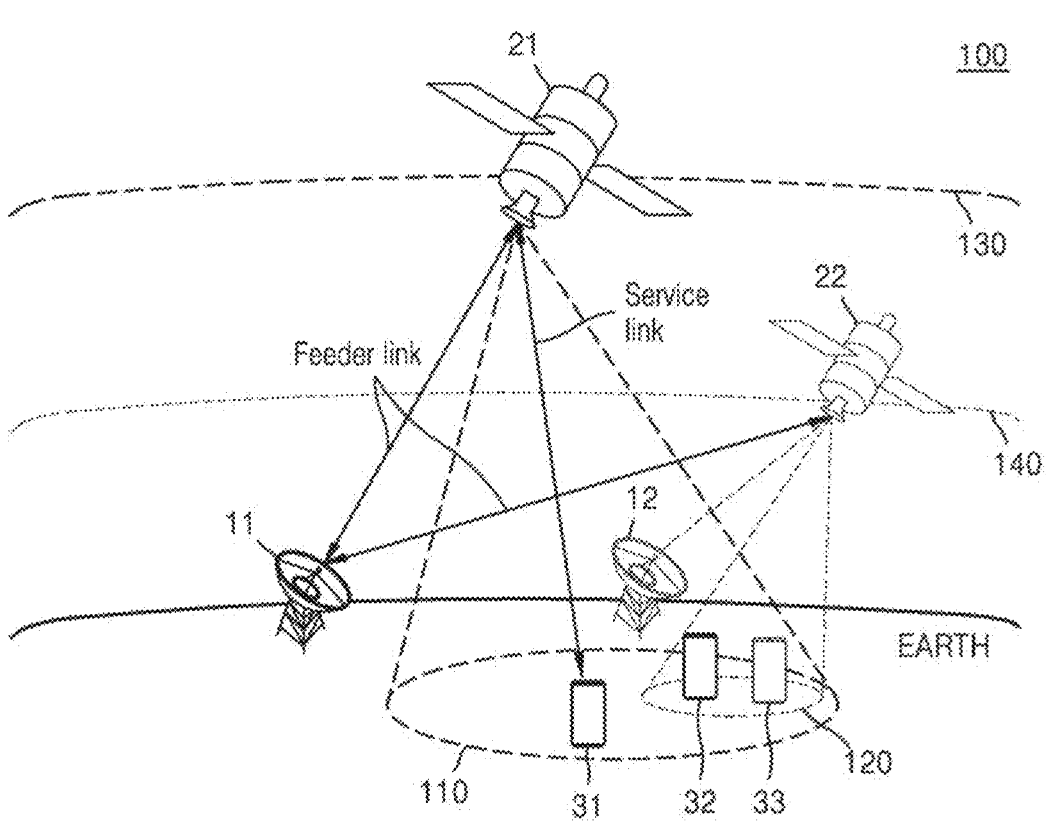
FIG. 1A is a block diagram illustrating a wireless communication system according to an embodiment.
Figure 1B:
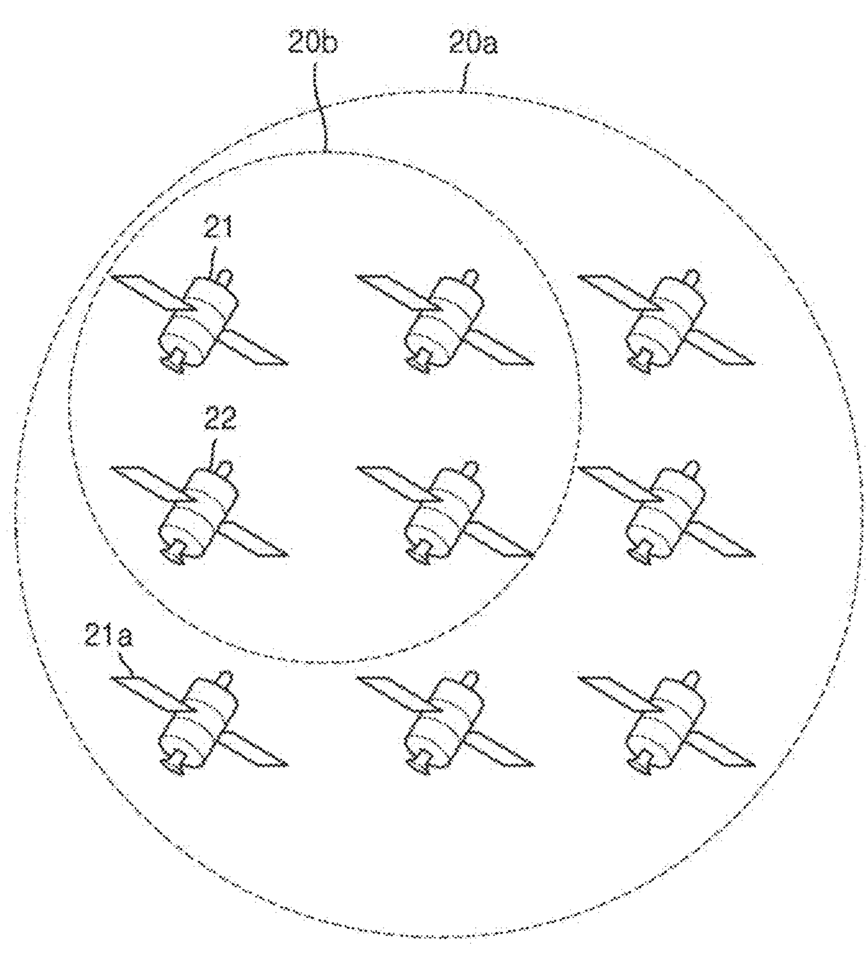
FIG. 1B is a block diagram illustrating a satellite group according to an embodiment.

FIG. 1A is a block diagram illustrating a wireless communication system according to an embodiment. FIG. 1B is a block diagram illustrating a satellite group according to an embodiment.

Although embodiments are hereinafter described with respect to a wireless communication system 100 supporting different radio access technologies (RATs) based on a new radio (NR) network and a long-term evolution (LTE) network, in particular, in accordance with the 3rd Generation Partnership Project (3GPP) release, embodiments are not limited to the NR network and the LTE network, and various embodiments may also be applied to the wireless communication system 100 supporting two or more different RATs. Embodiments may also be applied to other wireless communication systems having similar technical backgrounds or channel configurations, e.g., cellular communication systems such as LTE-advanced (LTE-A), wireless broadband (WiBro), global system for mobile communication (GSM), and next-generation communications such as 6th generation (6G), etc., or short-range communication systems such as Bluetooth and near field communication (NFC).

In various embodiments described below, hardware-based approaches are described as an example. However, because embodiments include a technology using both hardware and software, the embodiments are not intended to exclude a software-based approach.

Various functions described hereinafter may be implemented or supported by artificial intelligence (AI) technology or one or more computer programs, each of which consists of computer-readable program code and is executable on computer-readable media. The terms "application" and "program" refer to one or more computer programs, software components, a set of instructions, procedures, functions, objects, classes, instances, associated data, or parts thereof, which are suitable for implementation in computer-readable program code. The "computer-readable program code" may include various types of computer code including source code, object code, and executable code. The "computer-readable media" may include all types of media that are accessible by a computer, such as read-only memory (ROM), random access memory (RAM), a hard disk drive (HDD), compact discs (CDs), digital video discs (DVDs), or any other types of memory. "Non-transitory" computer-readable media exclude wired, wireless, optical, or other communication links through which transient electrical or other signals are transmitted. The non-transitory computer-readable media may include media in which data may be permanently stored and media in which data may be stored and then overwritten, such as a rewritable optical disk or an erasable memory device.

Referring to FIG. 1A, the wireless communication system 100 may include a base station 11 or 12, a satellite group, and a terminal 31, 32, or 33. The base station 11 or 12 may generally refer to a fixed station that communicates with the terminal 31, 32, or 33 and/or other base stations (not shown), and exchange control information and data by communicating with the terminal 31, 32, or 33 and/or other cells (not shown). For example, the base station 11 or 12 may be referred to as a Node B, an evolved-Node B (eNB), a next-generation Node B (gNB), a sector, a site, a base transceiver station (BTS), an access point (AP), a relay node, a remote radio head (RRH), a radio unit (RU), a small cell, a wireless device, or the like.

Embodiments are applicable to a wireless communication system including at least one base station supporting a plurality of RATs. In some embodiments, a single base station may support a plurality of RATs. In some embodiments, plural base stations may support a plurality of RATS. For example, in some embodiments, the wireless communication system 100 may include one base station 11 or 12 supporting both an LTE-based non-terrestrial network (hereinafter referred to as an NTN) and an NR-based NTN. In other words, each of the base station 11 and the base station 12 may support both the LTE-based NTN and the NR-based NTN. In some embodiments, the wireless communication system 100 may separately include a base station (not shown) supporting an LTE-based NTN and a base station (not shown) supporting an NR-based NTN.

Referring further to FIG. 1B, the satellite group may include a first satellite group 20*a* that includes a plurality of first satellites and is configured to support a plurality of RATs. The first satellite group 20*a* may be a group configured by the base station 11 or 12. For example, in some embodiments, the base station 11 may configure the first satellite group 20*a*. In some embodiments, the base station 12 may configure the first satellite group 20*a*. For example, the base station 11 or 12 may consider speeds and altitudes of satellites and RATs that the satellites support, and configure a plurality of satellites including a third satellite 21 supporting an NR-based NTN and a fourth satellite 22 supporting an LTE-based NTN as the first satellite group 20*a*.

The first satellite group 20*a* may perform a higher signaling procedure with the base station 11 or 12 via a feeder link. Higher signaling may be referred to as higher layer signaling. For example, the third satellite 21 or the fourth satellite 22 may transmit or receive an uplink signal or a downlink signal to or from the base station 11 or 12 via the feeder link. In some embodiments, the third satellite 21 may transmit or receive an uplink signal or a downlink signal to or from the base station 11 via a feeder link. In some embodiments, the third satellite 21 may transmit or receive an uplink signal or a downlink signal to or from the base station 12 via a feeder link. In some embodiments, the fourth satellite 22 may transmit or receive an uplink signal or a downlink signal to or from the base station 11 via a feeder link. In some embodiments, the fourth satellite 22 may transmit or receive an uplink signal or a downlink signal to or from the base station 12 via a feeder link.

The third satellite 21 may be a geostationary orbit (GEO) satellite, and the fourth satellite 22 may be a low earth orbit (LEO) satellite. For example, the third satellite 21 may be a satellite that maintains a fixed position in altitude and azimuth relative to a preset position on Earth at a first altitude 130 (see FIG. 1A). The fourth satellite 22 may be a satellite orbiting the Earth at a second altitude 140 (see FIG. 1A). In an embodiment, the first altitude 130 may be an altitude of 35,786 kilometers (km), and the second altitude 140 may be an altitude of about 300 km to about 1500 km.

The terminal 31, 32, or 33 may be stationary or mobile. The terminal 31, 32, or 33 may refer to any devices capable of transmitting and receiving data and/or control information by communicating with the base station 11 or 12 via the first satellite group 20*a*. For example, the terminal 31, 32, or 33 may be referred to as a user equipment (UE), a terminal equipment, a mobile station (MS), a mobile terminal (MT), a user terminal (UT), a subscribe station (SS), a wireless communication device, a wireless device, a handheld device, or the like.

The terminal 31, 32, or 33 may receive a synchronization signal from a first satellite 21*a* in the first satellite group 20*a*, and perform initial access to the first satellite group 20*a* including the first satellite 21*a* via the synchronization signal. In some embodiments, the first satellite 21*a* may periodically transmit a synchronization signal including a synchronization signal block (SSB) which includes a master information block (MIB) and a system information block (SIB). The terminal 31, 32, or 33 may enter a cell area (not shown) of the first satellite 21*a* with mobility. The cell area of the first satellite 21*a* may include a cell area 110 of the third satellite 21. In other words, the cell area of the first satellite 21*a* may be larger than the cell area 110 of the third satellite 21. When entering the cell area of the first satellite 21*a*, the terminal 31, 32, or 33 may receive a synchronization signal including an SSB from the first satellite 21*a*, and perform initial access to the first satellite 21*a* based on the synchronization signal. Embodiments in which the terminal 31, 32, or 33 performs initial access to the first satellite 21*a* based on a synchronization signal are described below with reference to FIGS. 2 to 4.

In some embodiments, when the base station 11 or 12 establishes an initial connection with the terminal 31, 32, or 33 by using the first satellite group 20*a*, the first satellite group 20*a* may transmit synchronization signals including SSBs, taking into account two or more different RATs. Embodiments in which the first satellite group 20*a* transmits synchronization signals by considering two or more different RATs are described below with reference to FIG. 5.

After the initial access to the first satellite 21*a*, the terminal 31, 32, or 33 may perform a higher layer signaling procedure with the first satellite 21*a*. In some embodiments, the terminal 31, 32, or 33 may transmit terminal information to the first satellite 21*a*, and the first satellite 21*a* may transmit satellite information to the terminal 31, 32, or 33 based on the received terminal information. The terminal information may include location information about the terminal 31, 32, or 33, a combination of RATs supportable by the terminal 31, 32, or 33, and information about supported bands. The first satellite 21*a* may transmit, based on the received terminal information, to the terminal 31, 32, or 33, satellite information that is information about a second satellite group 20*b* including second satellites supporting the RATs supported by the terminal 31, 32, or 33. The second satellites may be some of the plurality of first satellites included in the first satellite group 20*a*. The satellite information may include RAT information, altitude information, speed information, and transmission mode information regarding the second satellites included in the second satellite group 20*b*.

The terminal 31, 32, or 33 may transmit first channel status information to the first satellite 21*a* based on the higher layer signaling procedure with the first satellite 21*a*. In some embodiments, the terminal 31, 32, or 33 may measure, based on the satellite information, channel characteristics of each of the second satellites included in the second satellite group 20*b*, and transmit the first channel status information to the first satellite 21*a* based on the measured channel characteristics. The first channel status information may mean channel state information (CSI). The CSI may include a channel-quality indicator (CQI), a rank indicator (RI), a precoder-matrix indicator (PMI), or a combination thereof.

The base station 11 or 12 may configure a particular satellite in the second satellite group 20*b* as a primary satellite by performing a higher layer signaling procedure with the first satellite 21*a* based on the first channel status information and the satellite information, and set an RAT to be applied to the configured primary satellite. The terminal 31, 32, or 33 may perform wireless communication with the configured primary satellite. In some embodiments, the base station 11 or 12 may configure the third satellite 21 as the primary satellite by using one of RAT information, altitude information, speed information, and transmission mode information regarding each of the third satellite 21 and the fourth satellite 22 included in the second satellite group 20*b*. The terminal 31, 32, or 33 may perform wireless communication with the third satellite 21 configured as the primary satellite.

For example, in the case of using RAT information, when the terminal connected via initial access is the terminal 31 that supports both the NR-based NTN and the LTE-based NTN, the base station 11 or 12 may configure the third satellite 21 supporting the NR-based NTN, instead of the fourth satellite 22 supporting the LTE-based NTN, as a primary satellite. In the case of using altitude information, the base station 11 or 12 may configure the third satellite 21 located at a higher altitude (e.g., the first altitude 130) than the fourth satellite 22 located at the second altitude 140 as a primary satellite. In the case of utilizing speed information, the base station 11 or 12 may configure the third satellite 21 that is a GEO satellite maintaining a fixed position at a lower speed than the fourth satellite 22 that is a LEO satellite orbiting the Earth as a primary satellite. In the case of utilizing transmission mode information, the base station 11 or 12 may configure the third satellite 21 as a primary satellite by considering whether the third satellite 21 is a bent-pipe satellite or a re-generative satellite.

For example, when the third satellite 21 supports two or more different RATs, the base station 11 or 12 may set an NR-based NTN among the two or more different RATs as an RAT to be applied to the third satellite 21.

The primary satellite (e.g., the third satellite 21) may configure a particular satellite in the second satellite group 20*b* as a secondary satellite based on supporting satellite list information including satellites supporting RATs supported by the terminal 32 or 33. In some embodiments, when the terminal 32 or 33 performs wireless communication with the third satellite 21 that is the primary satellite, the third satellite 21 may transmit supporting satellite list information associated with the second satellite group 20*b* to the terminal 32 or 33. The terminal 32 or 33 may attempt access to a satellite in the second satellite group 20*b* based on the received supporting satellite list information. The supporting satellite list information may include information about a position, a speed, and a band of each of the second satellites included in the second satellite group 20*b*.

For example, the terminal 32 or 33 may measure, based on the supporting satellite list information, channel characteristics of each of the second satellites included in the second satellite group 20*b*, and transmit second channel status information to the third satellite 21 based on the measured channel characteristics. The second channel status information may mean CSI. The CSI may include CQI, RI, PMI, or a combination thereof. The third satellite 21 may configure the fourth satellite 22 as a secondary satellite, based on the second channel status information and terminal information. The terminal information may include location information about the terminal 32 or 33, a combination of RATs supportable by the terminal 32 or 33, and information about supported bands.

The primary satellite may transmit control information to a terminal connected via the initial access to control the configured secondary satellite. For example, to perform scheduling, the third satellite 21 may transmit downlink control information (DCI) to the terminal 32 or 33 connected via the initial access. The third satellite 21 may indicate activation or deactivation of the fourth satellite 22 as well as a handover of the fourth satellite 22.

The secondary satellite may perform a user plane function (UPF). The UPF may include packet routing and forwarding, packet inspection, quality of service (QOS) handling, packet filtering, or traffic estimation. The secondary satellite may perform data communication with the connected terminal.

The second satellite group 20*b* may include a primary satellite and a secondary satellite, and the base station 11 or 12 may distribute the roles of the primary satellite and the secondary satellite, and configure the primary satellite and the secondary satellite to be satellites optimized for the terminal 31, 32, or 33 connected via initial access in the satellite group. Accordingly, communication connectivity between the base station 11 or 12 and the terminal 31, 32, or 33 may be increased, and data rates for satellite transmission may be increased.

Figure 2:
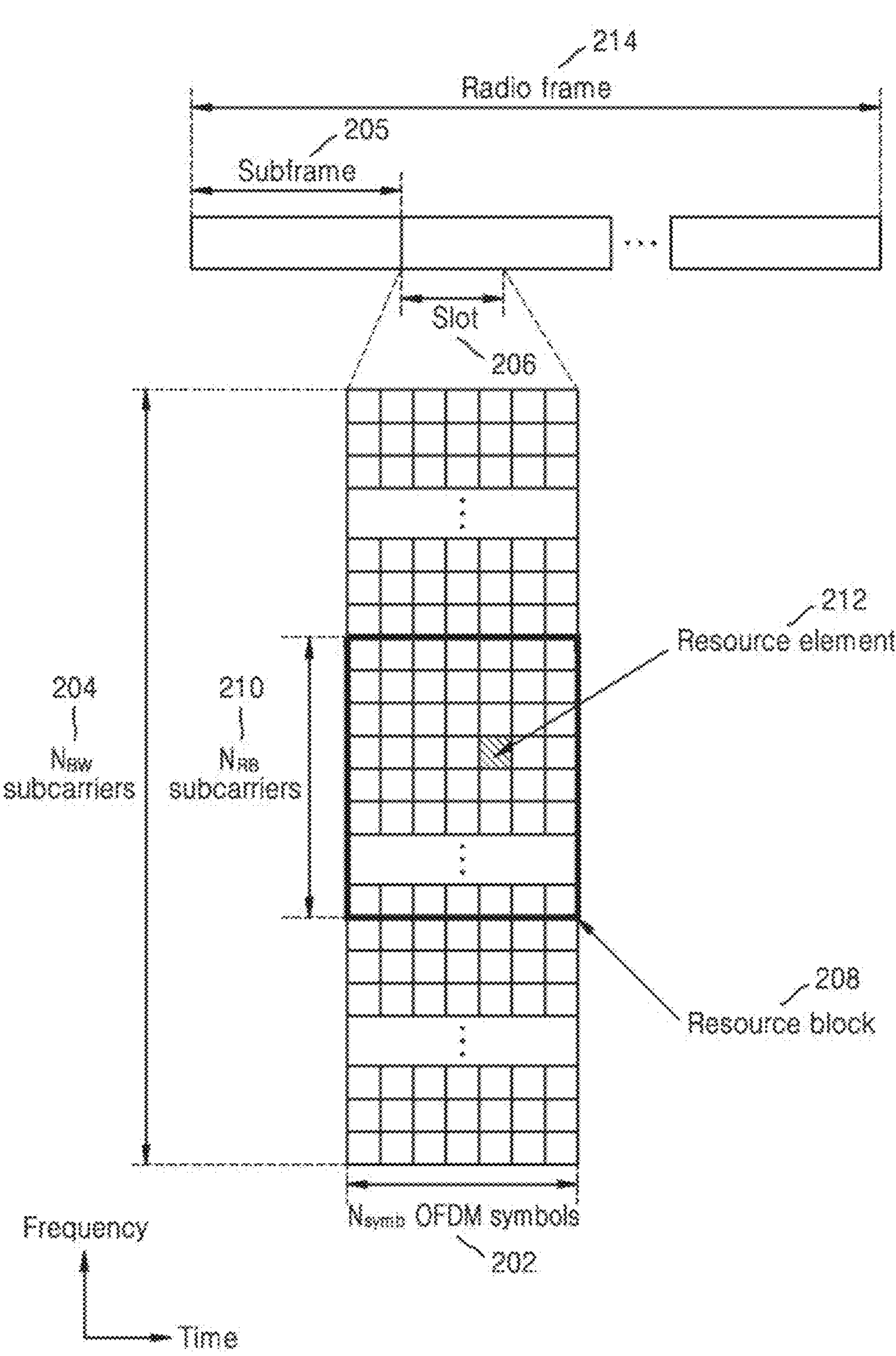
FIG. 2 is a diagram illustrating a basic structure of a time-frequency resource domain that is a radio resource region in a wireless communication system, according to an embodiment.

FIG. 2 is a diagram illustrating a basic structure of a time-frequency resource domain that is a radio resource region in a wireless communication system, according to an embodiment.

Referring to FIG. 2, the horizontal axis represents a time domain, and the vertical axis represents a frequency domain. The smallest transmission unit in the time domain is an orthogonal frequency division multiplexing (OFDM) symbol, and a number of $N_{symb}$ OFDM symbols 202 may be grouped to form one slot 206. Two adjacent slots may form one subframe 205. For example, the slot 206 may have a length of 0.5 ms, and the subframe 205 may have a length of 1.0 ms. However, this is merely an example, and in some embodiments, the length of the slot 206 may vary with a configuration thereof, and the number of slots 206 included in the subframe 205 may vary depending on the length of the slot 206. The time-frequency domain may be defined based on the slot 206 in an NR network. A radio frame 214 may be a unit of the time-domain consisting of ten subframes 205.

The smallest transmission unit in the frequency domain is a subcarrier, and an overall system transmission bandwidth may be composed of a total of $N_{BW}$ subcarriers 204. A basic resource unit in the time-frequency domain is a resource element (RE) 212 that may be represented by an OFDM symbol index and a subcarrier index. A resource block (RB) 208 may be defined as $N_{symb}$ consecutive OFDM symbols 202 in the time domain and $N_{RB}$ consecutive sub-carriers 210 in the frequency domain. Thus, the RB 208 may consist of $N_{symb}*N_{RB}$ RES 212. An RB pair is a unit of two consecutive RBs along the time axis and may be composed of $N_{symb}*2\ N_{RB}$ REs 212.

An SSB including a primary synchronization signal (PSS), a secondary synchronization signal (SSS), and a physical broadcast channel (PBCH) may be transmitted from a satellite group in the wireless communication system (100 of FIG. 1A) to the terminal (31, 32 or 33 of FIG. 1A) via resources in the time-frequency domain as illustrated in FIG. 2. In some embodiments, the satellite group within the wireless communication system 100 may transmit a MIB and an SIB to the terminal (31, 32 or 33 of FIG. 1A) via a synchronization signal including an SSB. The terminal (31, 32 or 33 of FIG. 1A) in the wireless communication system 100 may perform initial access to the satellite group based on the MIB and the SIB.

A CSI reference signal (CSI-RS) or cell specific reference signal (CRS) may be transmitted from a satellite group within the wireless communication system 100 to the terminal (31, 32 or 33 of FIG. 1A) via resources in the time-frequency domain as illustrated in FIG. 2. In some embodiments, the satellite group within the wireless communication system 100 may transmit a signal including a CSI-RS or a CRS to the terminal by performing a higher layer signaling procedure. A satellite group or a base station may obtain the characteristics of a downlink channel based on the CSI-RS or CRS. In addition, a sounding reference signal (SRS) may be transmitted from the terminal in the wireless communication system 100 to a satellite group via resources in the time-frequency domain as illustrated in FIG. 2, and the terminal may obtain the characteristics of an uplink channel based on the SRS.

Figure 3:
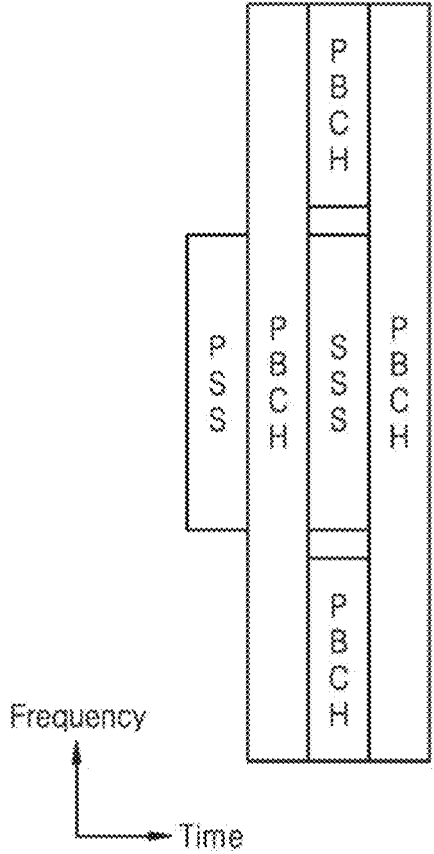
FIG. 3 is a diagram illustrating a basic structure of a synchronization signal block (SSB) transmitted by a satellite group in a wireless communication system, according to an embodiment.
Figure 4:
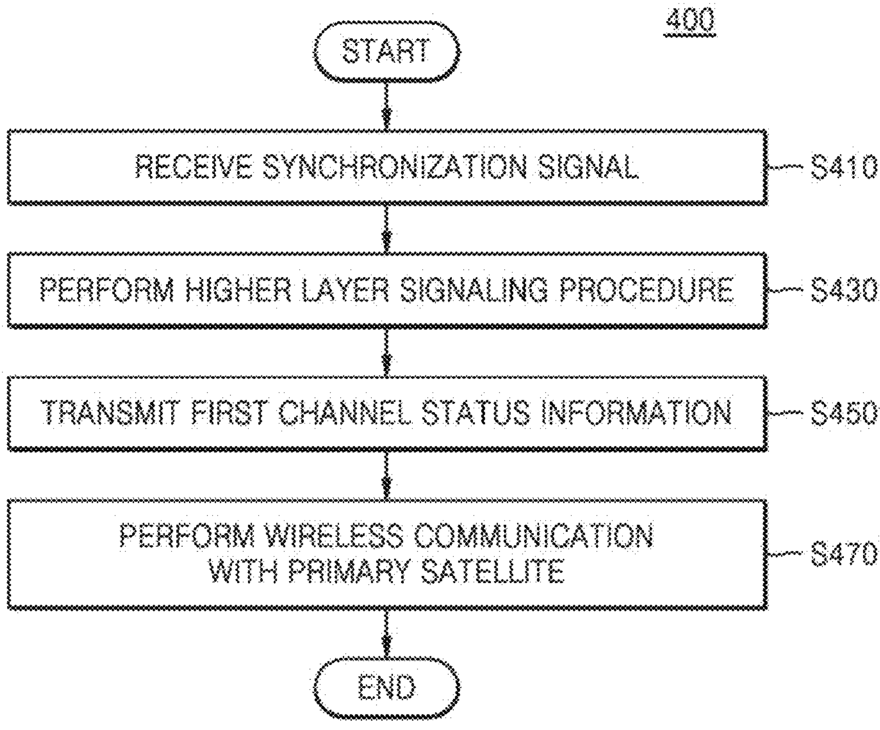
FIG. 4 is a flowchart of an operation method of a terminal in a wireless communication system, according to an embodiment.

FIG. 3 is a diagram illustrating a basic structure of an SSB transmitted by a satellite group in a wireless communication system, according to an embodiment. FIG. 4 is a flowchart of an operation method of a terminal in a wireless communication system, according to an embodiment.

Referring to FIGS. 2 and 3, FIG. 3 may be a diagram illustrating a time-frequency structure of a single SSB including a PSS, an SSS, and a PBCH. For example, the PSS in a single SSB structure may be transmitted on a first OFDM symbol of the SSB and occupy 127 subcarriers in the frequency domain, leaving the remaining subcarriers empty. The SSS in the single SSB structure may be transmitted on a third OFDM symbol of the SSB and occupy a same subcarrier set as the PSS. There may be 8 and 9 unoccupied subcarriers on either side of the SSS. The PBCH in the single SSB structure may be transmitted within second and fourth OFDM symbols of the SSB. 48 subcarriers may be used for the PBCH on each side of the SSS, and REs occupied by the PBCH may include not only REs used for PBCH transmission per SSB but also REs for a demodulation reference signal (DMRS) required for coherent demodulation of the PBCH.

Referring to FIGS. 1A, 1B, and 4, as shown in FIG. 4, an operation method 400 of a terminal in a wireless communication system may include a plurality of operations (S410 to S470). In operation S410, the terminal 31, 32, or 33 may receive a synchronization signal. In some embodiments, the terminal 31, 32, or 33 may receive a synchronization signal from the first satellite 21*a* in the first satellite group 20*a*, and perform initial access to the first satellite group 20*a* including the first satellite 21*a* via the synchronization signal. The synchronization signal may be a signal including an SSB including a MIB and SIBs, and the first satellite 21*a* may periodically transmit the SSB. An SSB may be transmitted in a different frequency band depending on an RAT supported by a satellite, and some embodiments thereof will be described below with reference to FIG. 5.

In some embodiments, the terminal 31, 32, or 33 searching for an SSB may enter a cell area (not shown) of the first satellite 21*a* with mobility, and obtain information about the cell area of the first satellite 21*a* based on the SSB contained in the synchronization signal transmitted by the first satellite 21*a*. For example, the terminal 31, 32, or 33 may detect a PSS of the found SSB. The PSS may be the first signal searched for by the terminal 31, 32, or 33 attempting to access the wireless communication system 100. When detecting the PSS, the terminal 31, 32, or 33 may know the transmission timing of an SSS. By detecting the SSS, the terminal 31, 32, or 33 may determine a physical cell identity (PCI) of the cell area of the first satellite 21*a*. The terminal 31, 32, or 33 may obtain a MIB via the PBCH, and the MIB may include remaining system information that the terminal 31, 32, or 33 needs to know. The remaining system information may include information about SIBs, and the SIBs may include system information that is information about all pieces of common information necessary for the terminal 31, 32, or 33 to operate properly within the wireless communication system 100. Accordingly, the terminal 31, 32, or 33 may obtain, via the PBCH, system information the terminal 31, 32, or 33 needs to know before accessing the wireless communication system 100.

In some embodiments, the terminal 31, 32, or 33 may perform initial access via random access based on information about the cell area of the first satellite 21*a* and system information that the terminal 31, 32, or 33 needs to know before accessing the wireless communication system 100. The random access may mean an initial access procedure performed between the terminal and the network to access a cell when the terminal finds the cell.

In operation S430, the terminal 31, 32, or 33 may perform a higher layer signaling procedure. In some embodiments, the terminal 31, 32, or 33 may transmit terminal information to the first satellite 21*a*, and the first satellite 21*a* may transmit, based on the received terminal information, to the terminal 31, 32, or 33, satellite information that is information about a second satellite group 20*b* including second satellites supporting RATs supported by the terminal 31, 32, or 33. That is, the terminal 31, 32, or 33 may transmit terminal information to the first satellite 21*a*, and receive, from the first satellite 21*a*, based on the terminal information, satellite information about the second satellite group 20*b* including second satellites supporting RATs supported by the terminal 31, 32, or 33.

In operation S450, the terminal 31, 32, or 33 may transmit first channel status information. In some embodiments, the terminal 31, 32, or 33 may measure, based on the satellite information, channel characteristics of each of the second satellites included in the second satellite group 20*b*, and transmit the first channel status information to the first satellite 21*a* based on the measured channel characteristics.

In some embodiments, the base station 11 or 12 may configure the third satellite 21 from the second satellite group 20*b* as a primary satellite by performing a higher layer signaling procedure with the first satellite 21*a*, based on the first channel status information and the satellite information.

In some embodiments, the base station 11 or 12 may configure the fourth satellite 22 from the second satellite group 20*b* as a primary satellite by performing the higher layer signaling procedure with the first satellite 21*a*, based on the first channel status information and the satellite information. For example, the base station 11 or 12 may obtain location information about the terminal 31, 32, or 33 via the first satellite 21*a*. When the terminal 31, 32, or 33 is located in a curved terrain such as a valley rather than a flat land, such as a desert, the shorter the distance between the terminal and the satellite, the greater the communication connectivity therebetween. Accordingly, by performing a higher layer signaling procedure based on location information about the terminal 31, 32, or 33 and satellite information including altitude information about the second satellite group 20*b*, the base station 11 or 12 may transmit DCI to the fourth satellite 22 located at the second altitude 140 that is lower than the first altitude 130, and configure the fourth satellite 22 as a primary satellite.

In operation S470, the terminal 31, 32, or 33 may perform wireless communication with the configured primary satellite. In some embodiments, the terminal 31, 32, or 33 may perform wireless communication with the third satellite 21 configured as the primary satellite.

Figure 5:
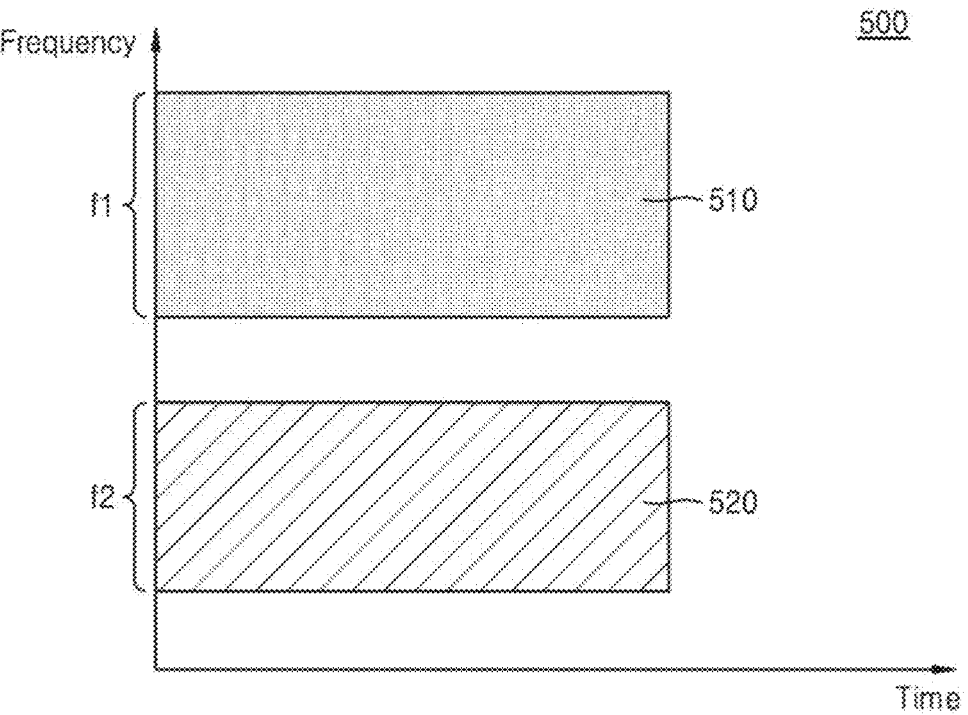
FIG. 5 is a graph for describing synchronization signals transmitted by a satellite group supporting different radio access technologies (RATs) in a wireless communication system, according to an embodiment.

FIG. 5 is a graph for describing synchronization signals transmitted by a satellite group supporting different RATs in a wireless communication system, according to an embodiment.

Referring to FIGS. 1A, 1B, 4, and 5, a graph 500 of FIG. 5 may be a graph for illustrating regions for synchronization signals including SSBs, which are transmitted by the first satellite group 20*a* included in the wireless communication system 100 in operation S410.

In some embodiments, the first satellite group 20*a* may include a plurality of first satellites and may be configured to support a plurality of RATs, and the first satellite group 20*a* may transmit synchronization signals corresponding to two or more different RATs. For example, the first satellite group 20*a* may include a satellite supporting an NR-based NTN and a satellite supporting an LTE-based NTN. For the satellite supporting the NR-based NTN, a synchronization signal for initial connection with a terminal (31, 32 or 33 of FIG. 1A) may be scheduled in a first region 510 corresponding to a first frequency band f1. For the satellite supporting the LTE-based NTN, a synchronization signal for initial connection with a terminal (31, 32 or 33 of FIG. 1A) may be scheduled in a second region 520 corresponding to a second frequency band f2. The first satellite group 20*a* may periodically transmit a plurality of synchronization signals by allocating a synchronization signal to a different region for each RAT operating in different frequency bands. The terminal 31 supporting the NR-based NTN may receive the synchronization signal scheduled in the first region 510, and the terminal 32 or 33 supporting the LTE-based NTN may receive the synchronization signal scheduled in the second region 520. Each of the terminals 31, 32, and 33 may perform, based on a received synchronization signal, initial access to a particular satellite that has transmitted the synchronization signal.

For example, when the first satellite 21*a* supports both the NR-based NTN and the LTE-based NTN, a synchronization signal corresponding to the NR-based NTN may be scheduled in the first region 510, and a synchronization signal corresponding to the LTE-based NTN may be scheduled in the second region 520. Accordingly, terminals supporting different RATs may also be able to initially access the first satellite 21*a*.

Because terminals supporting different RATs may receive synchronization signals from the first satellite group 20*a*, and may be stably connected to the first satellite group 20*a*, communication connectivity may be increased.

Figure 6:
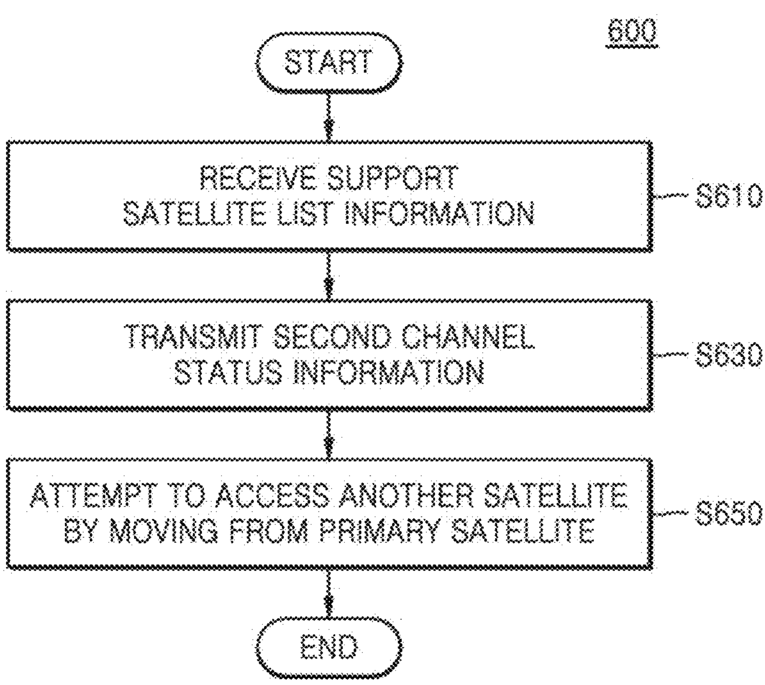
FIG. 6 is a flowchart of an operation method of a terminal in a wireless communication system so as to attempt to access a secondary satellite, according to an embodiment.

FIG. 6 is a flowchart of an operation method of a terminal in a wireless communication system to attempt to access a secondary satellite, according to an embodiment. As illustrated in FIG. 6, an operation method 600 of a terminal in a wireless communication system to attempt to access a secondary satellite may include a plurality of operations S610 to S650.

Referring to FIGS. 1A, 1B, and 6, in operation S610, the terminal 32 or 33 may receive supporting satellite list information. In some embodiments, when the terminal 32 or 33 performs wireless communication with the third satellite 21 that is the primary satellite, the third satellite 21 may transmit supporting satellite list information associated with the second satellite group 20*b* to the terminal 32 or 33. The supporting satellite list information may include information about a position, a speed, and a band of each of the second satellites included in the second satellite group 20*b*.

In operation S630, the terminal 32 or 33 may transmit second channel status information. In some embodiments, the terminal 32 or 33 may measure, based on the supporting satellite list information, channel characteristics of each of the second satellites included in the second satellite group 20*b*, and transmit second channel status information to the third satellite 21 based on the measured channel characteristics. For example, the terminal 32 or 33 may perform a higher layer signaling procedure with the third satellite 21. Higher layer signaling may include radio resource control (RRC) signaling or medium access control-control element (MAC-CE) signaling for configuring scheduling for a cell area. The third satellite 21 may transmit a CSI-RS or a CRS to the terminal 32 or 33 via higher layer signaling, and the terminal 32 or 33 may measure channel characteristics based on the CSI-RS or CRS to report the second channel status information to the third satellite 21.

In operation S650, the terminal 32 or 33 may attempt to access another satellite by moving from the primary satellite. In some embodiments, the third satellite 21 may configure the fourth satellite 22 as a secondary satellite based on the second channel status information and terminal information, and the terminal 32 or 33 may attempt to access the fourth satellite 22. The terminal information may include location information about the terminal 32 or 33, a combination of RATs supportable by the terminal 32 or 33, and information about supported bands. The terminal 32 or 33 may perform wireless communications with the fourth satellite 22 after accessing the fourth satellite 22.

In some embodiments, when the secondary satellite has already been configured, another satellite having the best channel characteristics in relation to a particular terminal may be configured as a secondary satellite by performing operations S610, S630, and S650. For example, when the fourth satellite 22 is configured as a secondary satellite, the terminal 31 may not have the best characteristics of a channel with the fourth satellite 22, and the terminal 31 may receive, from the third satellite 21, supporting satellite list information associated with the second satellites included in the second satellite group 20*b*. Based on the received supporting satellite list information, the third satellite 21 may configure a particular satellite having the best characteristics of a channel with the terminal 31 in the second satellite group 20*b* as a secondary satellite.

Because the primary satellite may configure a satellite having the best characteristics of a channel with a terminal in a satellite group as a secondary satellite, communication connectivity between the base station and the terminal may be increased, and data rates for satellite transmission may also be increased.

Figure 7:
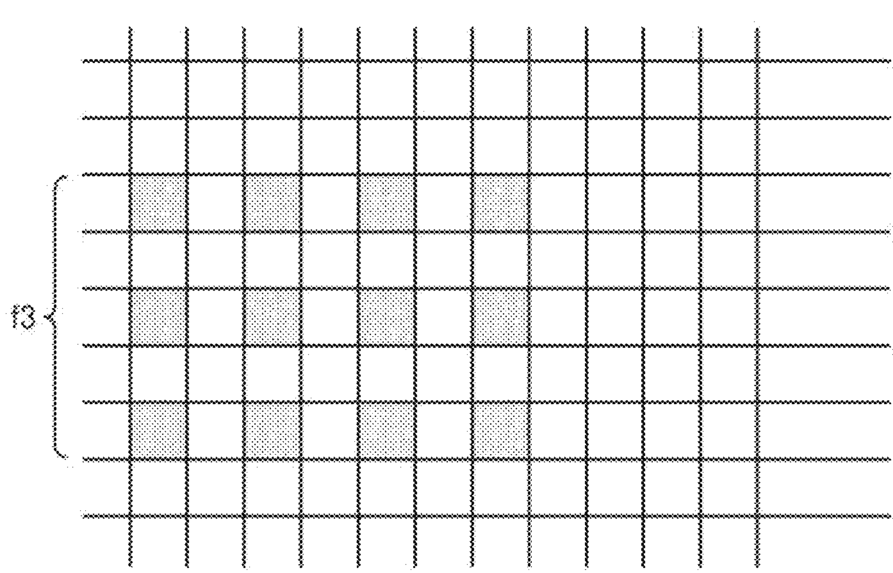
FIG. 7 is a graph for illustrating regions of satellite group signals rate-matched in a wireless communication system, according to an embodiment.
Figure 7:
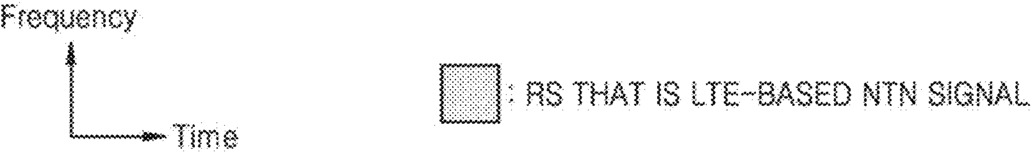

FIG. 7 is a graph for illustrating regions of satellite group signals rate-matched in a wireless communication system according to an embodiment.

Referring to FIGS. 1A, 1B, and 7, the graph of FIG. 7 may be a graphical representation of downlink signals in a third frequency band f3 in the time-frequency domain, the downlink signals including a RS such as CSI-RS or CRS transmitted by a satellite supporting an LTE-based NTN.

In some embodiments, the base station 11 or 12 may perform rate-matching of downlink signals including RSs from a satellite group supporting two or more different RATs. Rate-matching may refer to a mechanism in which, for downlink signals corresponding to different RATs and having overlapping frequency bands, the base station 11 or 12 schedules other downlink signals so that they do not overlap with a resource region where one downlink signal is allocated.

For example, downlink signals from a satellite supporting LTE as an RAT in the second satellite group 20*b* may include RSs that are LTE-based NTN signals allocated to a fixed resource region. For downlink signals transmitted by the third satellite 21 supporting an NR as an RAT, the base station 11 or 12 may schedule a RS that is an NR-based NTN signal so that the RS does not overlap with a resource region where a RS that is an LTE-based NTN signal is located. In some embodiments, the base station 11 or 12 may perform rate-matching around not only a region where a RS is transmitted but also a region where a synchronization-related signal among LTE-based NTN signals is transmitted.

When terminals supporting different RATs access a specific satellite group, errors in signal transmission may occur when downlink signals are allocated to a same resource region. In embodiments, rate-matching allows downlink signals not to overlap, thereby increasing communication connectivity between a base station and a terminal, and increasing data rates for satellite transmission.

Figure 8:
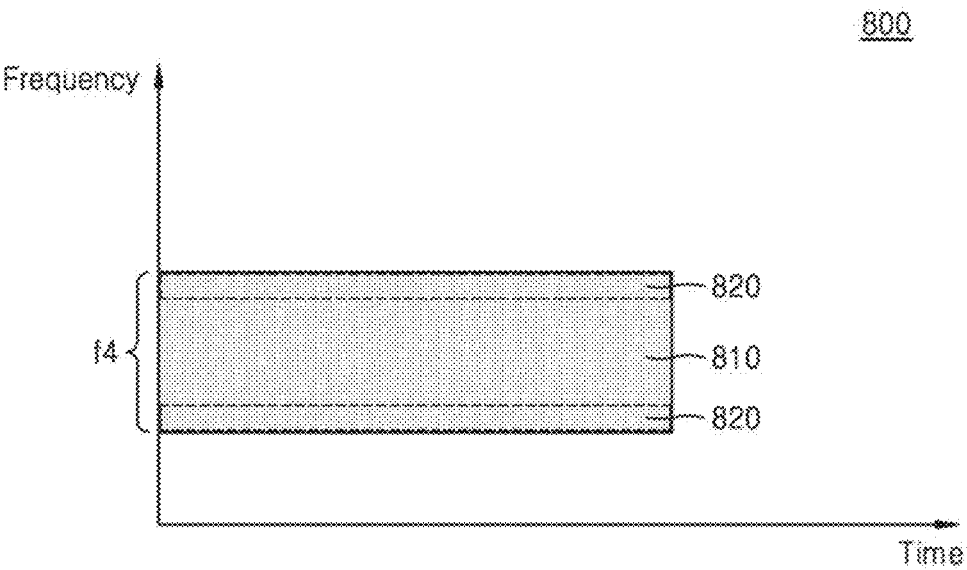
FIG. 8 is a graph for illustrating regions of satellite group signals rate-matched by taking into account a Doppler effect in a wireless communication system, according to an embodiment.

FIG. 8 is a graph for illustrating regions of satellite group signals rate-matched by taking into account a Doppler effect in a wireless communication system, according to an embodiment.

Referring to FIGS. 1A, 1B, and 8, the graph of FIG. 8 is a graphical time-frequency domain representation of downlink signals scheduled in a third region 810 corresponding to a fourth frequency band f4 and transmitted by a satellite supporting an NR-based NTN.

In some embodiments, when a satellite supporting an NR as an RAT transmits a downlink signal to the terminal, the base station 11 or 12 may schedule the downlink signal to not overlap with a part of a resource region corresponding to a guard band or guard subcarrier region. The guard band or guard subcarrier region may be a fourth region 820, and represent an edge portion of a resource region allocated to the downlink signal transmitted by the satellite supporting the NR as an RAT. When the satellite supporting the NR as an RAT transmits a downlink signal to the terminal, interference may occur due to the Doppler effect. The Doppler effect may refer to a phenomenon in which the frequency and wavelength of a wave change depending on a relative velocity between a wave source and an observer, and interference caused by the Doppler effect may cause errors in signal transmission and reception. To address the errors caused by the Doppler effect, the base station 11 or 12 may schedule the downlink signal not to overlap with a resource region corresponding to the fourth region 820. For example, the base station 11 or 12 may schedule a downlink signal transmitted by the third satellite 21 supporting the NR as an RAT so that the downlink signal is allocated to the third region 810 but does not overlap with the resource region corresponding to the fourth region 820. When a downlink signal is rate-matched to avoid overlapping with a portion of the resource region corresponding to the guard band or guard subcarrier region, signal interference may be eliminated, and accordingly, communication connectivity may be increased.

FIG. 9 is a block diagram illustrating an electronic device according to an embodiment.

Referring to FIG. 9, an electronic device 1000 may include a memory 1010, a processor 1020, an input/output (I/O) controller 1040, a display 1050, an input device 1060, and a communication processor 1090. In some embodiments, the memory 1010 may be configured as a plurality of memories. Configurations and functions of the components are now described.

The memory 1010 may include a program storage 1011 for storing programs for controlling an operation of the electronic device 1000 and a data storage 1012 for storing data generated during program execution. The data storage 1012 may store data for operations of an application program 1013, or may store data generated from the operations of the application program 1013.

The program storage 1011 may include the application program 1013. The programs included in the program storage 1011 may be sets of instructions and may also be expressed as instruction sets. The application program 1013 may include program code for executing various applications operating on the electronic device 1000. In other words, the application program 1013 may include code (or commands) for various applications run by a processor 1022.

Moreover, the electronic device 1000 may include the communication processor 1090 that performs communication functions for voice communication and data communication. A peripheral device interface 1023 may control connections among the I/O controller 1040, the communication processor 1090, the processor 1022, the processor 1022, and a memory interface 1021. The processor 1022 may control a plurality of base stations to provide services by using at least one software program. In this case, the processor 1022 may execute at least one program stored in the memory 1010 to provide a service corresponding to the program.

The communication processor 1090 may perform communication functions for communication with a satellite group in the wireless communication system (100 of FIG. 1A) supporting two or more different RATs described with reference to FIGS. 1A to 8. For example, the communication processor 1090 may perform a communication function for initial access to a primary satellite, and report channel status information to the primary satellite after the initial access. The communication processor 1090 may perform a communication function for accessing a secondary satellite configured based on channel quality information.

The I/O controller 1040 may provide an interface between I/O devices, such as the display 1050 and the input device 1060, and the peripheral device interface 1023. The display 1050 may display status information, input characters, moving pictures, still pictures, etc. For example, the display 1050 may display information about an application program executed by the processor 1022.

The input device 1060 may provide input data generated due to a selection by the electronic device 1000 to the processor unit 1020 via the I/O controller 1040. In this case, the input device 1060 may include a keypad including at least one hardware button, a touch pad for sensing touch information, etc. For example, the input device 1060 may provide the processor 1022 with the touch information, such as a touch, a touch movement, and a touch release that have been sensed by the touch pad, via the I/O controller 1040.

Figure 10:
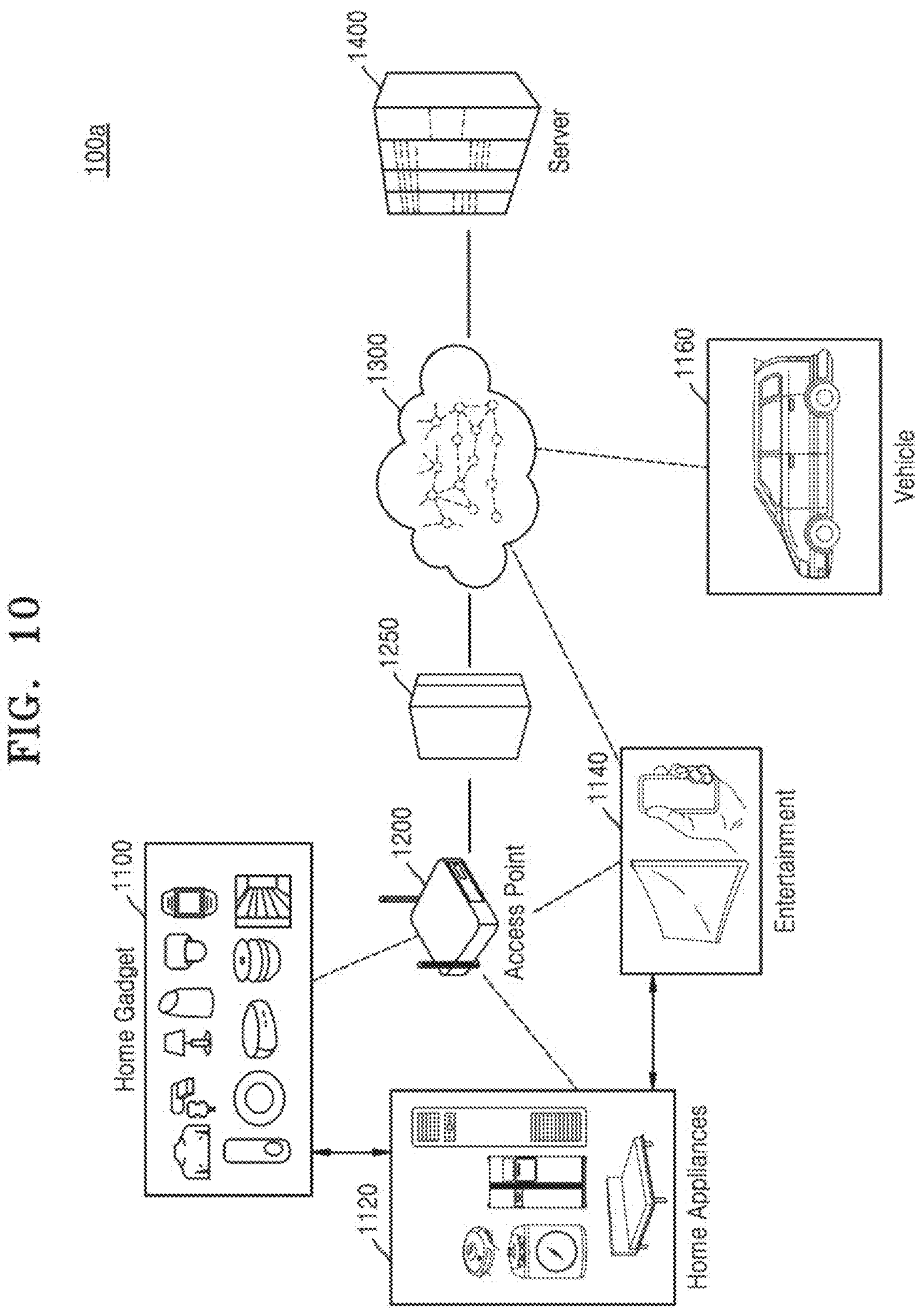
FIG. 10 is a conceptual diagram showing an Internet of things (IOT) network system to which various embodiments may be applied.

FIG. 10 is a conceptual diagram showing an Internet of things (IOT) network system to which an embodiment is applied.

Referring to FIG. 10, an IoT network system 100*a* may include a plurality of IoT devices 1100, 1120, 1140, and 1160, an access point 1200, a gateway 1250, a wireless network 1300, and a server 1400. IoT may refer to a network between interconnected objects using wired or wireless communication.

The plurality of IoT devices 1100, 1120, 1140, and 1160 may each form a group according to the characteristics of each IoT device. For example, the plurality of IoT devices 1100, 1120, 1140, and 1160 may respectively form a home gadget group, a home appliance/furniture group, an entertainment group, and a vehicle group. The IoT devices 1100, 1120, and 1140 may be connected to a communication network or other IoT devices via the access point 1200. The access point 1200 may be embedded in one IoT device. The gateway 1250 may change a protocol to connect the access point 1200 to an external wireless network. The IoT devices 1100, 1120, and 1140 may be connected to an external communication network via the gateway 1250. The wireless network 1300 may include the Internet and/or a public network. The plurality of IoT devices 1100, 1120, 1140, and 1160 may be connected to the server 1400 that provides certain services via the wireless network 1300, and a user may use a service via at least one of the plurality of IoT devices 1100, 1120, 1140, and 1160.

According to embodiments, the plurality of IoT devices 1100, 1120, 1140, and 1160 may perform communication functions for communicating with a satellite group in the wireless communication system (100 of FIG. 1A) supporting two or more different RATs described with reference to FIGS. 1A to 8. That is, in some embodiments, each of the plurality of IoT devices 1100, 1120, 1140, and 1160 may correspond to one of the terminals 31, 32, or 33 in FIG. 1A. For example, the plurality of IoT devices 1100, 1120, 1140, 1160 may each perform a communication function for initial access to a primary satellite, and report channel status information to the primary satellite after the initial access. The communication processor 1090 may perform a communication function for accessing a secondary satellite configured based on channel quality information.

Various embodiments have been set forth above in the drawings and the specification. Although embodiments have been described using specific terms in the present specification, these terms are used only for the purpose of explaining the technical spirit of the present disclosure, and are not used to limit the meaning or the scope of the claims. Therefore, those of ordinary skill in the art will understand that various changes in form and details may be made therein and equivalent other embodiments are possible therefrom. Accordingly, the true scope of the present disclosure should be defined by the technical idea of the appended claims.

While various embodiment have been particularly shown and described with reference to the drawings, it will be understood that various changes in form and details may be made therein without departing from the spirit and scope of the following claims.

What is claimed is:

1. An operation method of a terminal, the operation method comprising:

receiving a synchronization signal from a first satellite in a first satellite group that includes a plurality of first satellites, the first satellite group being configured to support a plurality of radio access technologies (RATs);

performing a higher layer signaling procedure with the first satellite, based on the synchronization signal;

transmitting, based on the higher layer signaling procedure, to the first satellite, first channel status information regarding a second satellite group including a plurality of second satellites from among the plurality of first satellites, the second satellite group being configured to support a RAT supported by the terminal; and performing wireless communication with a satellite in the second satellite group that is configured as a primary satellite, based on the first channel status information.

2. The operation method of claim 1, further comprising:

receiving, from the primary satellite, supporting satellite list information associated with the second satellite group; and attempting to access, based on the supporting satellite list information, one of the plurality of second satellites from the second satellite group by moving from the primary satellite.

3. The operation method of claim 2, wherein the supporting satellite list information comprises information about a position, a speed, and a band of each of the plurality of second satellites in the second satellite group.

4. The operation method of claim 2, wherein attempting to access comprises:

transmitting, based on the supporting satellite list information, second channel status information about each of the plurality of second satellites in the second satellite group to the primary satellite.

5. The operation method of claim 1, wherein performing the wireless communication comprises receiving a rate-matched downlink signal from the primary satellite.

6. The operation method of claim 5, wherein:

the primary satellite is configured to support new radio (NR), and the rate-matched downlink signal is scheduled not to overlap with a resource region to which at least one of a reference signal and a synchronization-related signal is allocated.

7. The operation method of claim 5, wherein:

the primary satellite is configured to support a new radio (NR), and the rate-matched downlink signal is scheduled not to overlap with a resource region corresponding to a guard band or a guard subcarrier region.

8. The operation method of claim 1, wherein the first satellite group transmits a plurality of synchronization signals each corresponding to two or more different RATs, and receiving the synchronization signal comprises:

receiving, from the first satellite, one of the plurality of synchronization signals corresponding to the two or more different RATs.

9. The operation method of claim 1, wherein performing the higher layer signaling procedure comprises:

transmitting terminal information to the first satellite; and receiving satellite information from the first satellite, based on the terminal information.

10. The operation method of claim 9, wherein the terminal information comprises location information about the terminal, a combination of RATs supportable by the terminal, and information about supported bands, and wherein the satellite information comprises RAT information, altitude information, speed information, and transmission mode information regarding each of the plurality of second satellites of the second satellite group.

11. The operation method of claim 1, wherein the first satellite group comprises a group configured based on an altitude and a speed of each of the plurality of first satellites and based on a RAT supported by each of the plurality of first satellites.

12. An operation method of a terminal, the operation method comprising:

receiving a synchronization signal from a first satellite in a first satellite group that includes a plurality of first satellites, the first satellite group being configured to support a plurality of radio access technologies (RATs);

transmitting terminal information to the first satellite, based on the synchronization signal;

receiving satellite information from the first satellite, based on the terminal information;

transmitting, based on the satellite information, to the first satellite, first channel status information regarding a second satellite group including a plurality of second satellites among the plurality of first satellites, the second satellite group being configured to support a RAT supported by the terminal; and performing wireless communication with a satellite from among the plurality of second satellites of the second satellite group that is configured as a primary satellite, based on the first channel status information.

13. The operation method of claim 12, wherein the terminal information comprises location information about the terminal, a combination of RATs supportable by the terminal, and information about supported bands, and wherein the satellite information comprises RAT information, altitude information, speed information, and transmission mode information regarding each of the plurality of second satellites.

14. The operation method of claim 12, further comprising:

receiving, from the primary satellite, supporting satellite list information associated with the second satellite group;

transmitting, based on the supporting satellite list information, second channel status information about each of the plurality of second satellites of the second satellite group to the primary satellite; and attempting to access, based on the second channel status information, one of the plurality of second satellites from the second satellite group by moving from the primary satellite.

15. The operation method of claim 12, wherein performing the wireless communication comprises receiving a rate-matched downlink signal from the primary satellite.

16. The operation method of claim 15, wherein:

the primary satellite is configured to support new radio (NR), and the rate-matched downlink signal is scheduled not to overlap with a resource region to which at least one of a reference signal and a synchronization-related signal is allocated.

17. The operation method of claim 15, wherein:

the primary satellite is configured to support new radio (NR), and the rate-matched downlink signal is scheduled not to overlap with a resource region corresponding to a guard band or a guard subcarrier region.

18. A wireless communication system comprising:

a satellite group including a plurality of satellites, the satellite group configured to support a plurality of radio access technologies (RATs);

a base station configured to perform a first higher layer signaling procedure with the satellite group; and a terminal configured to:

receive a synchronization signal from the satellite group and perform, based on the synchronization signal, a second higher layer signaling procedure with a first satellite in the satellite group, receive satellite information based on the second higher layer signaling procedure, and transmit, based on the satellite information, first channel status information regarding a sub-satellite group of the satellite group that includes satellites configured to support a RAT supported by the terminal, wherein the base station is further configured to configure one satellite of the sub-satellite group as a primary satellite, based on the first channel status information, and wherein the primary satellite is configured to perform wireless communication with the terminal.

19. The wireless communication system of claim 18, wherein the terminal is further configured to:

receive, from the primary satellite, supporting satellite list information associated with the sub-satellite group, transmit, based on the supporting satellite list information, second channel status information about each of the satellites in the sub-satellite group to the primary satellite, and attempt to access, based on the second channel status information, one of the satellites from the sub-satellite group by moving from the primary satellite.

20. The wireless communication system of claim 18, wherein the terminal is further configured to receive a rate-matched downlink signal from the primary satellite based on a RAT different from a RAT supported by the primary satellite.

* * * * *